US005991845A

United States Patent [19]
Bohannon et al.

[11] Patent Number: 5,991,845
[45] Date of Patent: *Nov. 23, 1999

[54] RECOVERABLE SPIN LOCK SYSTEM

[75] Inventors: Philip Lewis Bohannon, Mt. Tabor; Daniel Francis Lieuwen, Plainfield; Abraham Silberschatz, Summit, all of N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/729,658

[22] Filed: Oct. 21, 1996

[51] Int. Cl.$^6$ ............................. G06F 13/14; G06F 13/00
[52] U.S. Cl. ......................... 710/200; 710/220; 710/240; 710/241
[58] Field of Search ..................................... 395/726, 727, 395/728, 729, 730, 731, 732, 674; 709/5, 225, 200; 710/220, 240, 241, 242, 244

[56] References Cited

U.S. PATENT DOCUMENTS

| | | | |
|---|---|---|---|
| 4,604,694 | 8/1986 | Hough | 364/200 |
| 5,274,823 | 12/1993 | Brenner et al. | 395/725 |
| 5,287,521 | 2/1994 | Nitta et al. | 395/725 |
| 5,392,433 | 2/1995 | Hammersley et al. | 395/725 |
| 5,428,761 | 6/1995 | Herlihy et al. | 395/425 |
| 5,623,670 | 4/1997 | Bohannon et al. | 395/726 |
| 5,671,446 | 9/1997 | Rakita et al. | 395/874 |
| 5,717,873 | 2/1998 | Rabe et al. | 395/290 |
| 5,784,623 | 7/1998 | Srinivasan | 395/726 |

OTHER PUBLICATIONS

J.M. Mellor–Crummey and M.L. Scott, "Algorithms for Scalable Synchronization On Shared–Memory Multiprocessors," ACM Transactions on Computer Systems, vol. 9, No. 1, Feb., 1991, pp. 22–47.

Thomas E. Anderson, "The Performance of Spin Lock Alternatives for Shared–Memory Multiprocessors," IEEE Transactions on Parallel and Distributed Systems, vol. 1, No. 1, Jan., 1990, pp. 6–16.

Gary Graunke and Shreekant Thakkar, "Synchronization Algorithms for Shared–Memory Multiprocessors" Jun., 1990, pp. 60–69.

*Primary Examiner*—Ayaz R. Sheikh
*Assistant Examiner*—Tim T. Vo

[57] ABSTRACT

A method for recovering spin locks in a system having one or more processes capable of accessing a shared resource, the system providing a lock indicating exclusive access to the shared resource by a single process and enabling one or more processes to repeatedly attempt to gain access to the lock when ownership of the shared resource is desired. The method includes generating a linked list queue structure containing a first process currently having exclusive access to the lock and one or more processes added to the queue structure to spin on the lock, each process capable of modifying the queue structure by obtaining exclusive access of the lock from a process having exclusive access of the lock and releasing the lock to another process in the linked list queue structure; detecting when one or more processes having exclusive access to the lock terminates, and upon detection, removing the terminated process from the queue structure, and restoring consistency to said linked list queue structure.

17 Claims, 9 Drawing Sheets

RECOVERABLE SPIN LOCK SYSTEM

FIELD OF THE INVENTION

The present invention relates to the field of multi processing systems having spin lock capability for preventing simultaneous access of shared memory structures and, more particularly, to a recoverable spin lock mechanism for scalable spin locks.

BACKGROUND OF THE INVENTION

FIG. 1 illustrates a block diagram of a shared memory computer system 10 that includes plurality of processes P1, P2, . . . , Pn−1, Pn operating simultaneously and in parallel under the control of a virtual operating system 14. In such shared memory computing environments, each process is capable of directly addressing memory, indicated generally as 12, and particularly, the processes may simultaneously access a memory resource 13, creating the possibility of collision. It is understood that processes may simultaneously access a hardware or other shared resource. Thus, such a system requires a mechanism for ensuring mutually exclusive access to the shared resource, e.g., 13.

A primitive concept for providing mutual exclusion in the virtual operating system 14 and preventing conflict between two or more processors attempting to access the shared memory location is to provide a semaphore which is a mutual exclusion construct or variable having values of either binary "0" or "1" that is implemented to provide mutual exclusion. However, operating system implemented semaphores may require context switching leading to overhead on the order of thousands of instructions. As a result, such semaphores are usually quite expensive to implement. If semaphores are frequently acquired and released, and if most acquisitions are uncontested (i.e., the semaphore is not held, and no other process is trying to acquire it), then the overhead of operating system semaphores can dominate the cost of computation.

Hardware supported semaphore implementations have been developed that guarantee mutual exclusion. For instance, semaphore implementations based on hardware provided processes such as test-and-set or compare-and-swap have been developed that are several orders of magnitude faster than operating system semaphores in that they consist of instructions that atomically read and then write to a single memory location. If a number of processors simultaneously attempt to update the same location, each processor will wait its turn. For critical sections operating on the shared memory structure, a lock is needed to provide mutual exclusion, and the atomic instructions are used to arbitrate between simultaneous attempts to acquire the lock. If the lock is busy, the processor attempting to acquire the lock can either relinquish its desire to obtain the lock so it can do other work, or it can wait or "spin" until the lock is released. In particular, an implementation in which a process repeatedly tries to acquire the lock in a tight loop is called a spin lock and the activity or retrying is known as "busy waiting" or simply "spinning".

In elementary spin lock algorithms, all processors operating in a multi-processor system frequently access and attempt to write to a single lock control variable to obtain access to the shared memory location. On most modem computer architectures, each processor will also attempt to cache the control variable, i.e., spin on locations in their caches. Since each update (or possibly even each attempted update that uses a synchronization instruction) will lead to cache invalidation messages being sent to all other processors, such elementary algorithms can overburden the caching system and hence, are not viable for processor-scalable architectures, i.e., shared memory multiprocessors of arbitrary size.

Many alternative software implemented elementary spin lock algorithms have been devised and the reader is directed to Anderson, Thomas E., "The Performance of Spin Lock Alternatives for Shared Memory Multiprocessors", I.E.E.E. Transactions on Parallel and Distributed Systems, Vol. 1, No. 1, pp. 6–16, January 1990, and Graunke, Gary, et al., "Synchronization Algorithms for Shared Memory Multiprocessors", I.E.E.E. Computer, Vol. 23, No. 6, pp. 60–69, June 1990, for an assessment of performance characteristics. One spin lock, in particular, is an array based queuing spin lock that comprises an explicit FIFO queue of spinning processors that spin on their own lock flag in a separate cache block associated with the process. When one processor finishes executing on the shared resource, it de-queues itself and sets the flag of the next processor in the queue that is waiting for exclusive access to the resource, i.e., it passes ownership of the lock. The array-based queuing spin lock makes use of a variety of hardware supported instructions.

One protocol called the MCS-lock protocol was developed to enable each lock acquisition and release with as a small number of accesses to remote memory locations. A detailed description of this protocol is to be found in John M. Mellor-Crummey and Michael L. Scott, "Algorithms for Scalable Synchronization on Shared-Memory Multiprocessors", A.C.M. Transactions on Computer Systems, 9(1):21–65, February 1991 (hereinafter the "MCS algorithm") the contents and disclosure of which are wholly incorporated by reference herein.

In the MCS algorithm, the spin lock acquisition queue is constructed dynamically by swap instructions, which is an atomically implemented function provided in the multiprocessing system architecture that exchanges the contents of a register with memory. In this algorithm, each processor of the multiprocessing system spins on a different variable in a different cache frame, with the first process in the queue holding the lock, and the next process in the queue acquiring the lock when the lock holding processor releases it. By assuring that 0(1) cache-invalidation messages will be sent by any acquisition or release of the lock in non-error cases, adding new processors does not significantly increase bus and invalidation traffic—thus, the scalability property is obtained. FIG. 1 illustrates the multiprocessing system including the MCS-algorithm spin-lock acquisition and release features 20. In the MCS-algorithm, an atomically implemented compare-and-swap function may be used for the transition during lock release from a queue to determine if it is the only processor in the queue, and, if so, to remove itself from the queue upon release of the lock Specifically, compare-and-swap compares the contents of a memory location against a first given value, returns a condition code to the user to indicate whether they are equal or not, and if they are equal, replaces the contents of the memory location with a second given value. For example, if the contents of the memory location are not equal, a NULL value may be returned.

FIG. 2A illustrates a queue node Qnode 15 that is associated with each process P1, P2, . . . , Pn of the multiprocessing system and that is a readable/writable data record or structure comprising a memory register or memory location located in the processor cache (not shown). In the MCS-algorithm, the Qnode 15 is constructed to contain a field having a locked flag 21 the contents of which represents the status of the spin lock for that process and having a value indicating whether the process owns the lock (OWNED) or whether the process is spinning (WAITING) prior to lock acquisition, or whether the lock has been released (RELEASED), i.e., the lock has been transferred to the next process in the queue. As shown in FIG. 2A, the Qnode 15 also contains a next pointer 23, which is the queue link and comprises an address location of the next member of the queue structure that will hold the lock.

FIG. 2B illustrates the lock acquisition queue structure 30 which is a linked list of one or more Qnodes $15_1$, $15_2$, ..., $15_n$ corresponding to one or more processors P1, ..., Pn, one of which is holding (owns) the lock and having exclusive access to the shared resource, and the remainder of which are spinning (waiting) on a lock as indicated by the value in their locked flags. Usually, the first process Qnode, e.g., $15_1$, of the queue 30 holds the lock and the subsequent processes desiring to acquire the lock are spinning on the lock with its next pointer, e.g., $23_1$, pointing to the address of the locked flag of the next Qnode, e.g., $15_2$, of the queue that is to hold the lock, e.g., $21_2$. To add a new processor to the queue that desires lock ownership, a spin lock acquisition function is implemented by the processing system 10 which utilizes the swap function atomically to add the new processor to the queue. As shown in FIG. 2B, the MCS algorithm also makes use of a lock structure 24 which is represented by a single variable called a lock tail 25 that always points to the last node, e.g., $15_n$, on the queue as shown by the broken arrow and may be atomically updated by invocation of the swap and/or compare-and-swap functions.

The MCS-algorithm is vulnerable to process failure in the respect that if a process terminates while waiting for the lock, once it receives the lock it will never release it. Similarly while owning or releasing the lock, the death of the process will prevent ownership from being passed on. Particularly difficult is the window of time between an initial swap in the lock acquisition code and a subsequent assignment which links the new node into the queue by filling the next field of the predecessor process. If a process has died or terminated after executing the swap, and before setting the next field, then the queue will become "broken" at that point. Thus, in pathological cases involving multiple process failures occurring in this same window, the queue becomes fragmented into separate lists.

In attempting to recover this fragmented list, it is difficult to distinguish between a next field which has not been set due to a terminated process from one which has not been set due to a very slow process.

In view of this drawback, there is the necessity to provide in a multiprocessor system, a recoverable lock, i.e., one that does not become permanently unavailable even if one or more of the processes accessing the lock terminates. An implementation of a recoverable lock would afford the system the ability to determine when a process terminates and to make the lock available again. The capability of recovering a spinning lock is particularly useful for servers such as transaction processors which consist of several processes which are often in continuous operation. The ability to determine the process having exclusive access of a standard spinning lock in spite of any sequence of process failures is a key requirement for recoverability. If the process having exclusive access can be reliably determined, then the shared data guarded by the lock can be returned to use if that process has terminated. However, such processes cannot be determined, a lock held by a terminated process is not easily distinguishable from a lock held by a very slow process.

In view of this, it would be highly desirable to provide a recoverable spin lock protocol that maintains the integrity of the spinning lock queue structure should there be a failure of the process having exclusive access to the lock or termination or failure of one or more of the spinning locks.

SUMMARY OF THE INVENTION

The recovering spin lock system of the invention is an improvement over the scalable spin lock MCS algorithm described above and incorporated by reference herein. Particularly, as in the MCS-algorithm, the recovering spin lock system implements a linked list queue structure tracking a process that has exclusive access to a shared resource by assigning it exclusive access of a spin lock, and provides for the addition to the queue structure, any new processes that desire exclusive access of the lock, i.e., that seek access to the shared resource, and identifying these new these processes in the queue structure as spinning on said lock. The recovering spin lock system of the invention improves upon the MCS-algorithm by providing a mechanism for detecting when a process having exclusive access or spinning on the lock terminates and, upon detecting a terminated process, removing the failed or terminated process from the queue structure. To ensure the integrity of the queue structure, the recovering spin lock system reassembles the linked list queue structure after processes that have failed or terminated are removed, and assigns exclusive access of the lock to a new process if the process that had previously owned the lock had terminated.

Advantageously, the recovering spin lock system is portable and may be ready implemented in multiprocessing systems employing atomically implemented hardware instructions such as swap and compare-and-swap, without the need for additional hardware.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

Reference may now be had to a preferred embodiment of the recoverable spin lock mechanism of the invention, taken in conjunction to the accompanying drawings, in which.

DETAILED DESCRIPTION OF THE PREFERRED EMBODIMENTS

Figure 3:
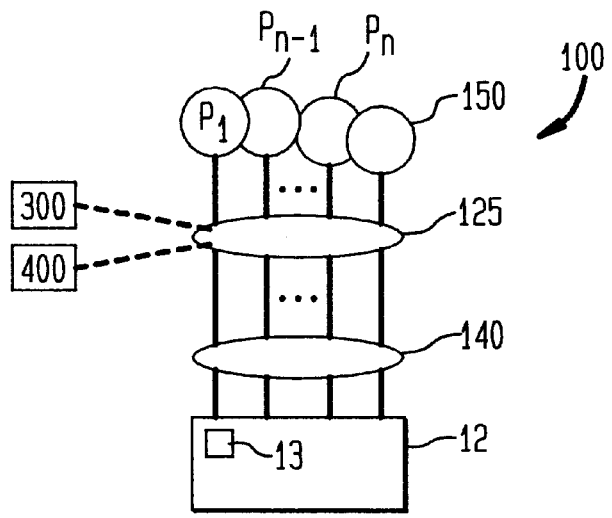
FIG. 3 is a diagram showing a multiprocessing system including the spin lock recovering system of the invention.

FIG. 3 illustrates the multiprocessing system 100 that includes a number of simultaneously operating processors P1, P2, . . . , Pn, operating under control of an operating system 140 and employing the recoverable spin lock system 125 of the invention. The recoverable scalable spin lock system 125 includes an additional process called the cleanup server 150, which is a mechanism that cooperates with the operating system for restoring the consistency of the lock queue structure when a process terminates. The recoverable spin lock system 125 of the invention includes, for each process, a recovering spin-lock acquisition protocol 300 and a recovering spin lock release protocol 400 that are modifications of the spin lock acquisition and release routines of the prior art MCS-algorithm to accommodate the implementation of the cleanup server 150 as will be described.

The cleanup server 150 of the recovering scalable spin lock system 125 is implemented as a routine that is started at system initialization and continues running while processing is taking place on the shared data. It should be understood that the cleanup server may be added to any multiprocessor operating system with no system modification or changes necessary. As shown in FIG. 3, the cleanup server 150 periodically polls the multiprocessing operating system 140 for any processes P1, P2, . . . , Pn that may have terminated, failed, or timed-out. Alternatively, or in addition to polling, the cleanup server 150 may be informed of a process death or time-out by one of the processes P1, . . . , Pn that have to wait an excessively long time for a semaphore. Thus, the cleanup server 150 will be informed when a process in the system finds that it has been waiting much longer for a lock than it ought to have waited. When the knowledge of a process failure is known, the cleanup server 150 implements a cleanup routine 500 to operate on the spin lock queue structure to recover the spin lock, i.e., determine that process having exclusive access to the lock, and further maintain the consistency and integrity of the spin lock queue structure of the recovering scalable spin lock system 125.

Figure 2A:
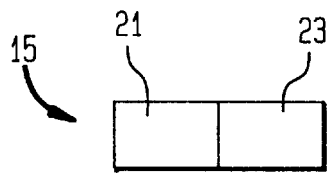
FIG. 2A is a diagram illustrating a Qnode data structure for a prior art spin-lock algorithm
Figure 2B:
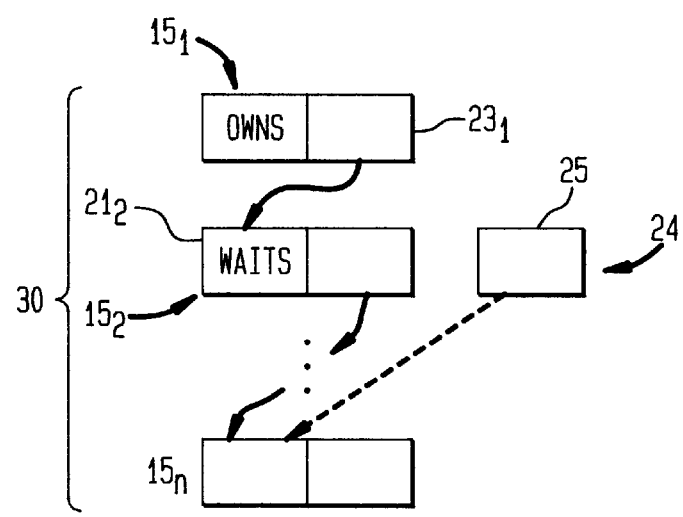
FIG. 2B is a diagram illustrating a linked list queue structure of processor nodes spinning on the lock in the prior art spin-lock algorithm.
Figure 4A:
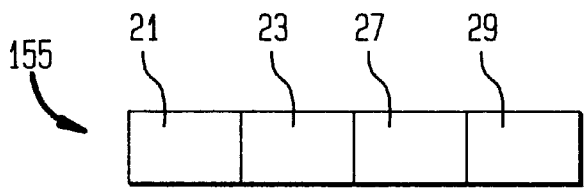
FIG. 4A is a diagram illustrating a Qnode data structure for the recovering spin-lock algorithm of the invention.
Figure 4B:
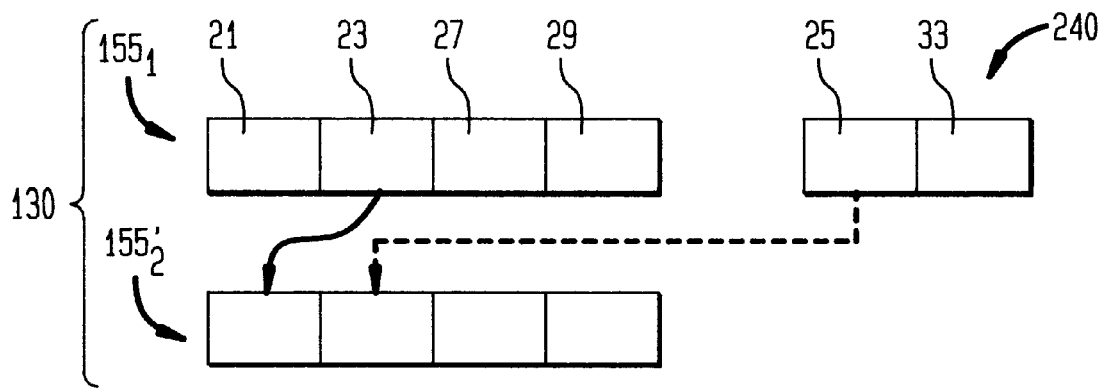
FIG. 4B is a diagram illustrating a linked list queue structure of processor nodes spinning on the lock in the recovering spin-lock algorithm of the invention.

As shown in FIGS. 4A and 4B, to accommodate the addition of the cleanup server 150 in the recoverable spin lock system 125, modified spin lock 240 and Qnode 155 data structures are generated. As shown in FIG. 4A, the modified Qnode data structure 155 includes the original per process Qnode data structure 15 (discussed above with reference to FIG. 2A) containing the locked flag 21 (representing the ownership status of the spin lock for that process) and the next pointer 23 (for pointing to the address location of the next member of the linked list queue structure 30), but additionally includes a pointer to a lock called wants pointer 27 and a Boolean flag 29 called volatile. The wants pointer 27 of a process is set to point to a lock when that process is interested in acquiring the lock but before an attempt is made to acquire it. As explained herein, the collection of each processes wants pointer provides the system with an overestimation of the set of possible owners of the spin lock and the collection of the status of each process's locked flag provides an under-estimate of lock ownership. As will be described in greater detail, this distinction is crucial for the operation of the clean-up routine. The volatile flag 29 is a flag that is set to true by a process to indicate that it (the process) is about to modify the structure of the queue, and is reset or unset (false) only after the modification of the queue (if any) has finished, and all stores made by the modification have reached the global store.

FIG. 4B illustrates a queue structure 130 that is a linked list of modified Qnode structures $155_1$, $155_2$, . . . etc. formed by the recoverable spin lock system 125 in the manner as herein described. As shown in FIG. 4B, the recoverable spin lock system 125 also implements a modified lock structure 240 having a tail pointer 25 that always points to the last node on the queue, and further includes a boolean flag called cleanup-in-progress 33. As will be explained in further detail below, this cleanup-in-progress flag 33 is set when the cleanup routine 500 is invoked after the cleanup server 150 has determined that a process has failed or terminated and its function is to prevent new processors from attempting to acquire or release the lock in the queue 300 while the cleanup routine is invoked. An exception to this, however, is that certain processes whose volatile flag 29 has already been set may continue to modify the Queue structure. In essence, the cleanup-in-progress flag 33 provides a barrier which, when raised, prevents any new processes from entering the set of potential owners deduced from the wants field 27 when the cleanup operation is in action or, prevents any new processes from entering the set of potential modifiers of the queue deduced from the volatile flag.

More specifically, if a process P has terminated with its wants pointer field 27 pointing to a lock, the cleanup server 150 will invoke the cleanup routine 500 to execute on the in-doubt lock. The cleanup routine 500 recovers the shared data if the lock was held by a terminated process, and repairs any broken links in the queue structure that may exist because of process death or termination. If the lock is in fact held by a terminated process, the cleanup routine calls a user-supplied routine to return the shared data to a consistent state, and releases the lock. In all cases, the cleanup routine releases the Qnode belonging to the terminated process(es).

The recovering spin-lock acquisition routine 300 implemented when a process is desirous of patching itself into the queue structure 130 of the recoverable spin lock system 125 is now described with reference to FIG. 5. A C-language pseudo-code representation implemented by the calling process is shown attached hereto in Appendix A. It is understood that all of the pseudo-code appended hereto are merely non-limiting examples for implementing the concepts of the recoverable spin lock system presented herein.

Figure 5:
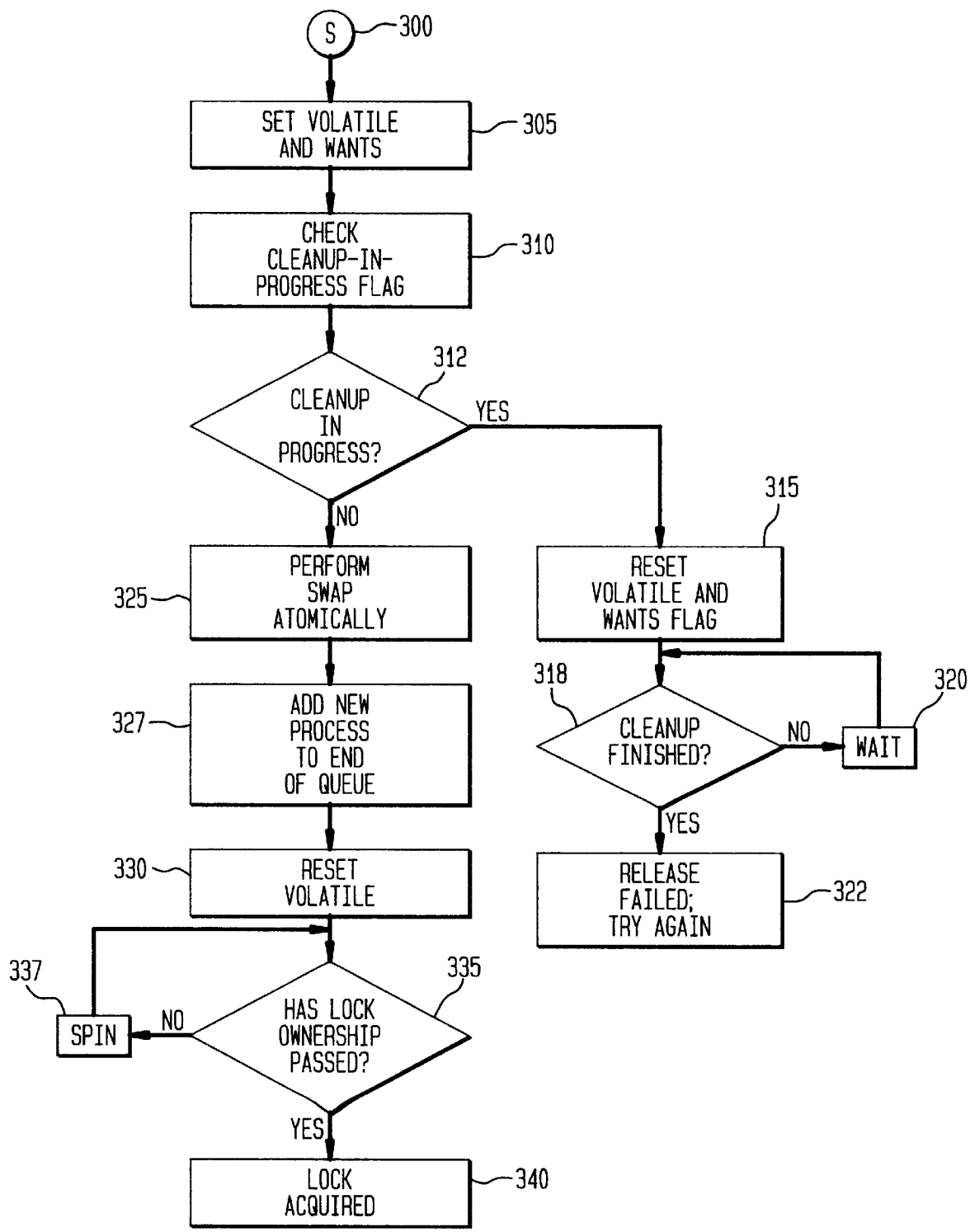
FIG. 5 illustrates the recovering spin-lock acquisition routine of the invention.

As shown in FIG. 5 the first step 305 of the recoverable spin lock acquisition procedure 300 implemented by a processor desirous of patching itself into the queue 130, involves initializing its representative Qnode 155 by setting its volatile flag 29 to true and setting the wants field 27 to point to the lock for indication that the process (called mynode) is intending to add itself to the queue structure. The next step 310 involves checking the status of the cleanup-in-progress flag 33. At step 312, if cleanup-in-progress is seen to be true, then at step 315 the wants flag 27 is set back to NULL and the volatile flag back to false, thus indicating that the process has been prevented from modifying the queue 130 due to the cleanup mechanism. Thus, at steps 318 and 320 the process waits until the cleanup routine is finished before returning failure to the caller at step 322 and prompting the calling process to try again.

If the cleanup-in-progress flag 33 was not set (i.e., false) at step 312, then, at step 325, the swap function is invoked to exchange simultaneously the contents of the address pointers so that lock→tail 25 points to the locked flag of new process, while returning a pointer to the next field of the previous Qnode thus, effectively adding itself to the queue structure. Then, at step 327, the previous Qnode's next pointer is assigned to point to the new process of the queue structure. Once this second assignment takes place, a traversal of the list will once again end with the newly added node pointed to by lock→tail. Next, at step 330, the volatile flag 29 is reset to false. Then, at step 335, a check is made to determine if ownership of the lock has been passed to the new process and specifically, whether the value of the new processor's locked flag 21 is a value indicating ownership. If not, then the processor spins at step 337 until ownership is passed, i.e., the new process's locked flag 21 is assigned the value of OWNED as shown at step 340. Otherwise, the new processor will immediately assume ownership of the lock if there was no previous owner, i.e., the locked flag is assigned the value of OWNED, and control is returned to the user code, which may now access the protected memory resource.

A major difference between the recoverable lock acquisition procedure and the prior art lock acquisition algorithm is that at step 330, the volatile flag 29 is reset false before waiting for the locked flag to be changed to OWNED. This is consistent with the meaning of volatile, since a process waiting on the lock at step 335 will not modify the queue structure again in that call to the recoverable spin lock acquisition procedure. It should be understood that the wants flag 27 continues to point to this lock until the lock is released.

The recovering spin-lock acquisition routine 400 implemented when a process is desirous of patching itself into the queue structure 130 of the recoverable spin lock system 125 is now described with reference to FIGS. 6A and 6B. A C-language pseudo-code representation implemented by the calling process is shown attached hereto in Appendix B.

Figure 6A:
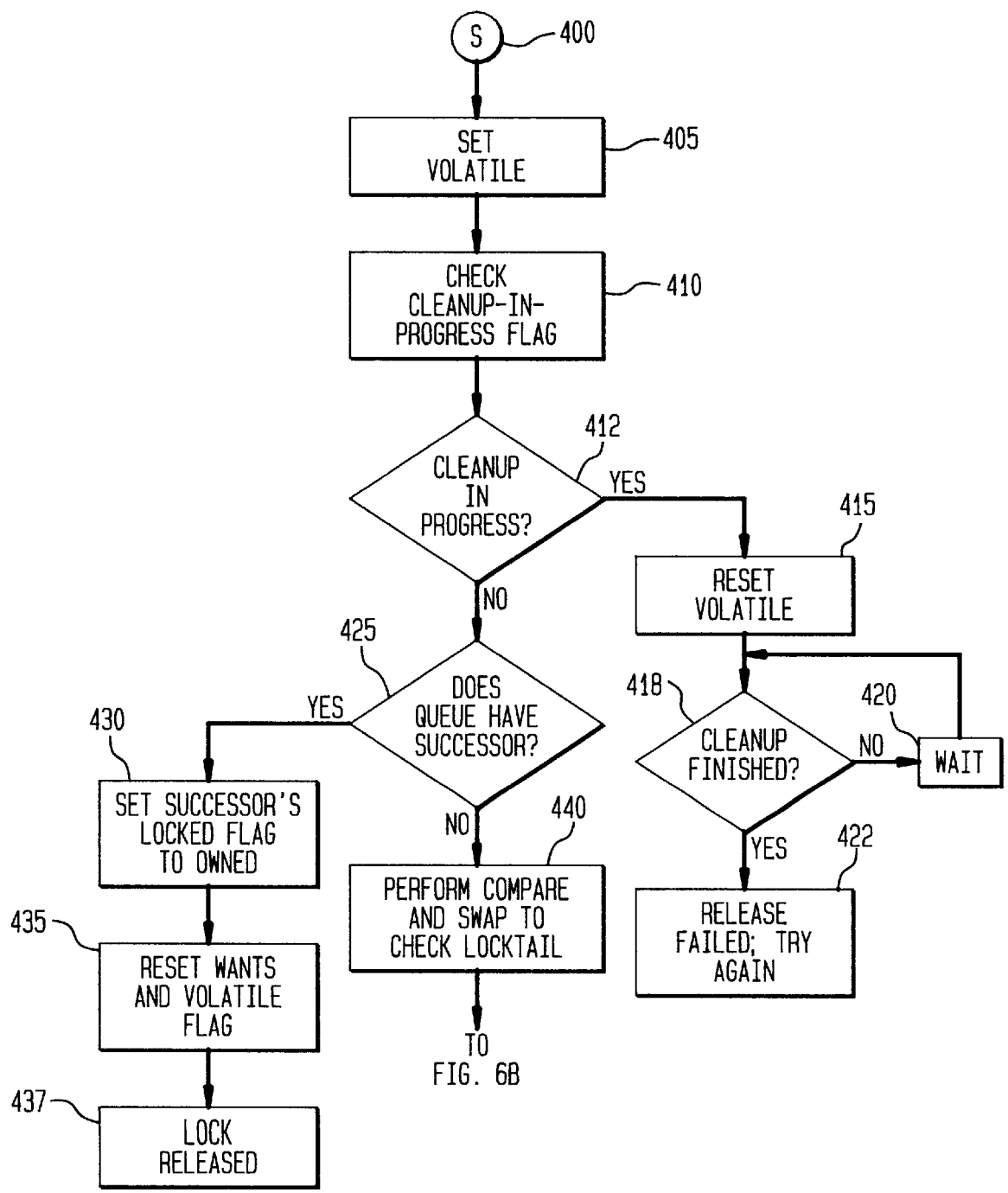
FIGS. 6A and 6B illustrate the recovering spin-lock release routine of the invention.
Figure 6B:
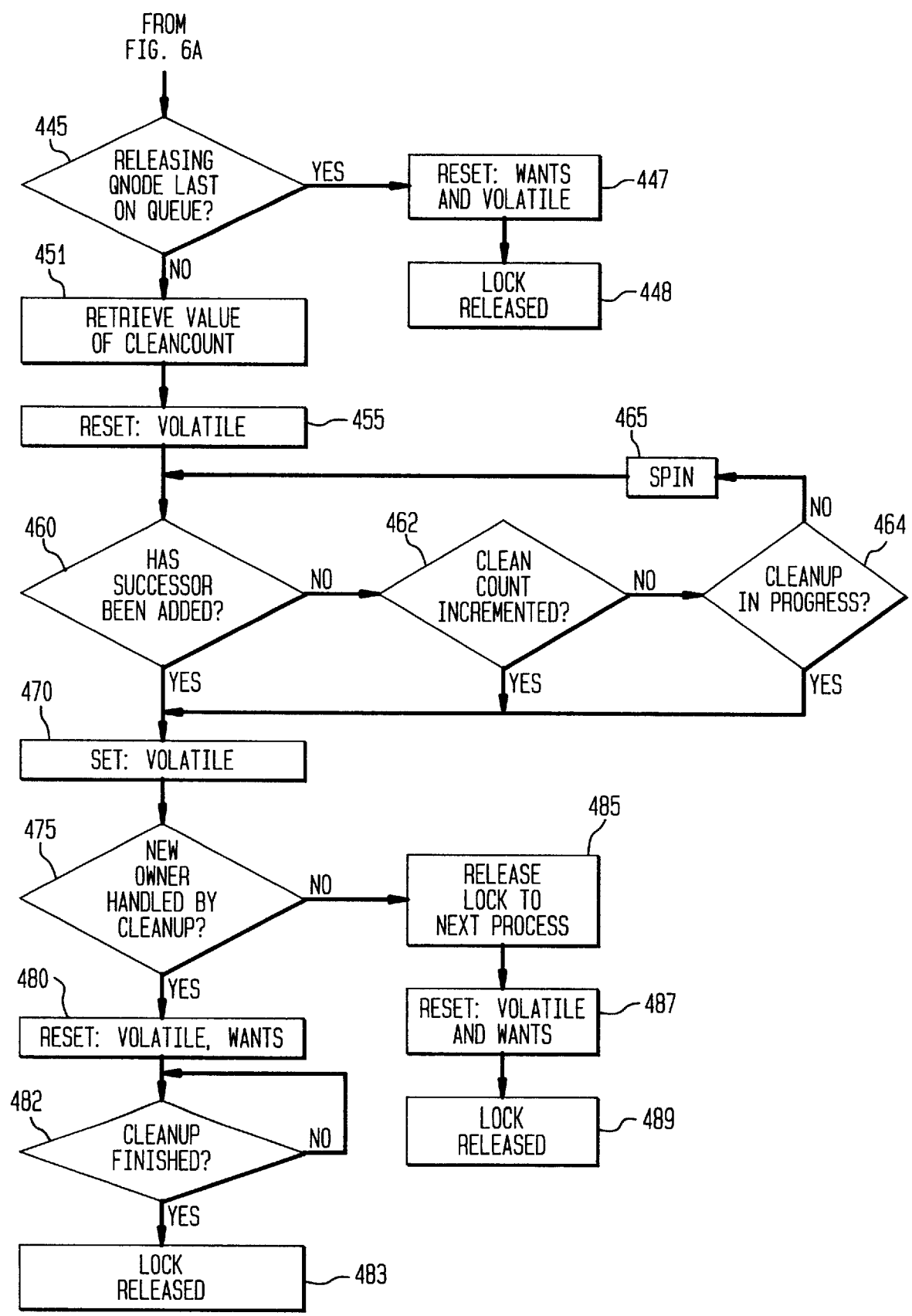

As shown in FIG. 6A, the first step 405 of the recoverable spin-lock release procedure 400 involves initializing the volatile flag 29 to true, to indicate the intention to modify the queue structure 30'. Next, at steps 410–422 the routine 400 checks for cleanup-in-progress as did the recoverable lock acquisition routine at corresponding steps 310–322. Particularly, step 410 involves checking the status of the cleanup-in-progress flag 33. At step 412, if cleanup-in-progress is determined to be true, then at step 415, the volatile flag is reset to false, thus preventing the process from releasing the lock due to the cleanup mechanism being active. Thus, at steps 418 and 420 the process waits until the cleanup routine is finished before returning failure to the caller at step 422 and prompting the calling processor to try again.

If the cleanup-in-progress flag 33 was not set (i.e., false) at step 412, then at step 425, a determination is made as to whether the Qnode process releasing the lock has a successor in the queue, i.e., whether the releasing Qnode's next pointer is null or pointing to the next successive Qnode on the queue. If the Qnode releasing the lock does have a successor (next pointer not null), then at step 430, the successor's locked flag is set to OWNED status, and the releasing Qnode is unlinked from the queue by setting its next pointer to null. Then, at step 435, the wants flag 27 is set back to NULL and the volatile flag back to false and the lock release is successful as indicated at step 437.

If at step 425, it was determined that there was no successor process to acquire the lock, then at step 440, a compare-and-swap is performed atomically to determine which Qnode the lock→tail pointer 25 is pointing. As shown in FIG. 6B, a determination is then made at step 445 to determine if the lock→tail pointer 25 points to the releasing processor Qnode indicting that it was the last process (alone) in the Queue. If the lock→tail pointer was pointing to the releasing Qnode, then, at step 447, an indication that the process is no longer modifying the queue structure is provided by setting volatile flag 29 to false and, that the process is no longer interested in the lock by setting wants field 27 to NULL. Thus, the lock release was successful as indicated at step 448.

If the compare-and-swap fails and it was determined at step 445 that lock→tail 25 points to some other Qnode even though the next pointer 23 of the Qnode had been determined to be null, then this indicates that another interloping process has tried to acquire the lock and has issued the swap at step 325 of the recoverable lock acquisition algorithm 300, but has not yet issued the assignment at step 327. In this case, as shown as steps 460 and 465, the process releasing the lock must wait (spin) on the interloping process which just added itself to the queue to set the releasing process's next field 23 to indicate that a successor has been added. However, to account for the case where that interloping process may terminate before passing ownership, which would in effect cause an infinite loop as the releasing process spins, a check is provided at steps 462 and 464, respectively, to determine whether the value of cleancount which had been retrieved at step 451 has been incremented and whether the cleanup routine has been invoked. The cleancount variable is a flag that is set by the cleanup routine that is incremented when the cleanup routine has assigned a new lock owner and ensures that the releasing process does not also attempt to pass on ownership, which would corrupt the locking mechanism by causing the lock to be released twice. Thus, if the determination at steps 462 and 464 indicates that the cleancount flag has been incremented, then the interloping process has terminated and the cleanup routine 500, will take responsibility for freeing the lock from the releasing process, e.g., while the process is spinning at step 465. If the condition that the lock ownership has passed (i.e., releasing process's next pointer is not NULL) or the cleanup routine is invoked or cleancount flag has already been updated, then at step 470, the volatile flag is set back to true. Next, at step 475, a determination is made as to whether new owner has been assigned or is about to be assigned by the cleanup routine. If the cleanup routine is taking or has taken responsibility for transferring ownership, then at step 480, the wants flag 27 is set back to NULL and the volatile flag back to false. At step 482 the process waits until the cleanup routine is finished before returning an indication that the lock release is successful as indicated at step 483.

If, at step 475, a determination is made that the assignment has or is about to made by the interloping process and the releasing process has a successor, then lock ownership is been passed at step 485 by setting the locked flag 25 of the successor process to OWNED. Then, at step 487, the wants flag 27 is set back to NULL and the volatile flag back to false and an indication that the lock release is successful is made at step 489.

It should be understood that the spinning invoked at step 465 is done with the volatile flag unset (step 455) to ensure the key property that processes make progress while their volatile flag is set to true. If a process were to wait on another process while its volatile flag is set, the second process could terminate preventing the first process from progressing, and violating this property. Once the volatile flag is set back to true, the check must be made for cleanup-in-progress, because of the necessity that processes do not go from a non-volatile state to modifying the structure of the queue list while cleanup is going on.

For multiprocessing system architectures that do not employ the atomically implemented compare-and-swap function, the recoverable spin-lock release procedure 400 described above with reference to FIGS. 6A and 6B may be implemented with just the swap instruction. This modified recoverable spin-lock release procedure 600 shown in FIGS. 7A and 7B and a pseudo-code representation of such an algorithm may be found in Appendix D.

Figure 7A:
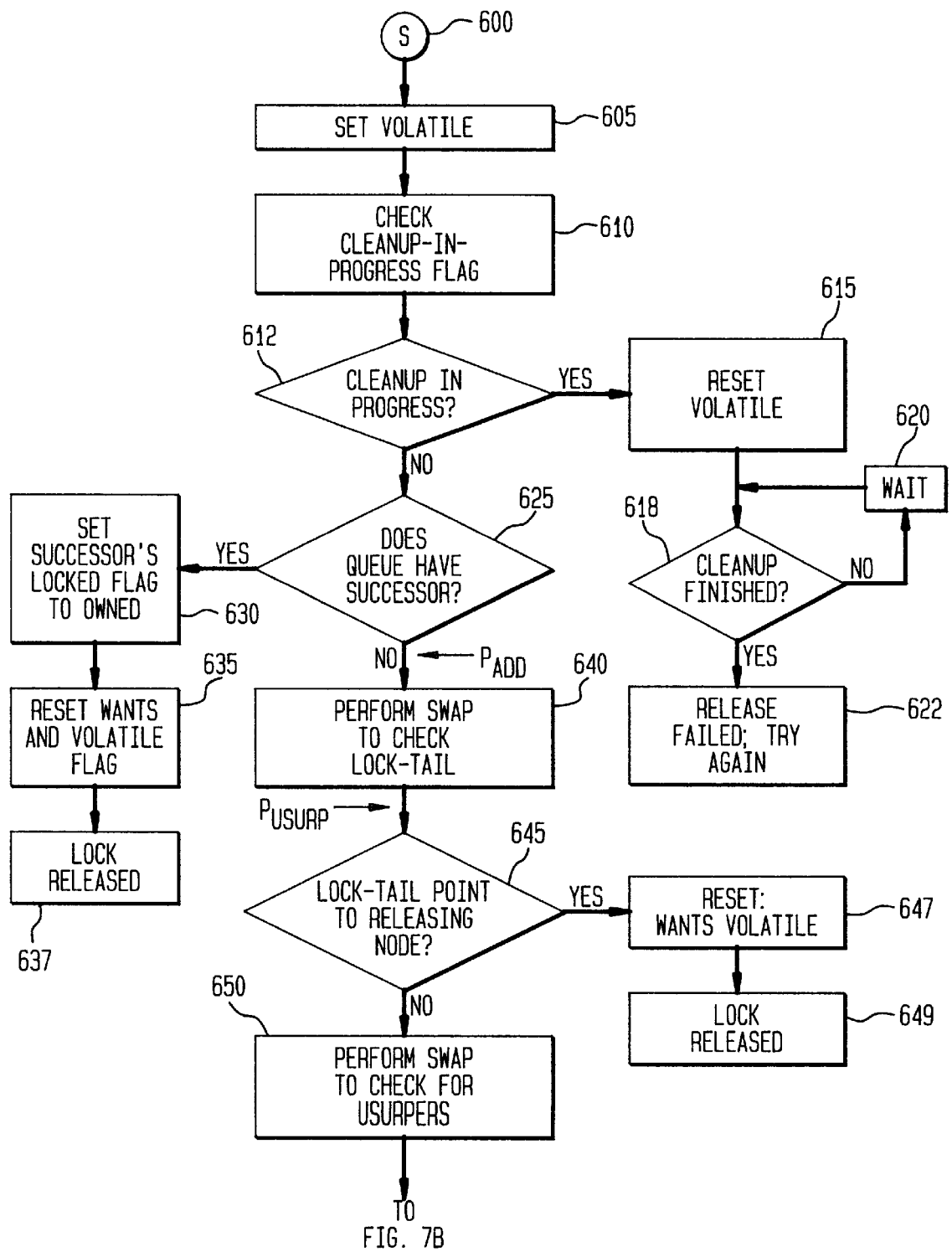
FIGS. 7A and 7B illustrate another embodiment of the recovering spin-lock release routine of the invention.
Figure 7B:
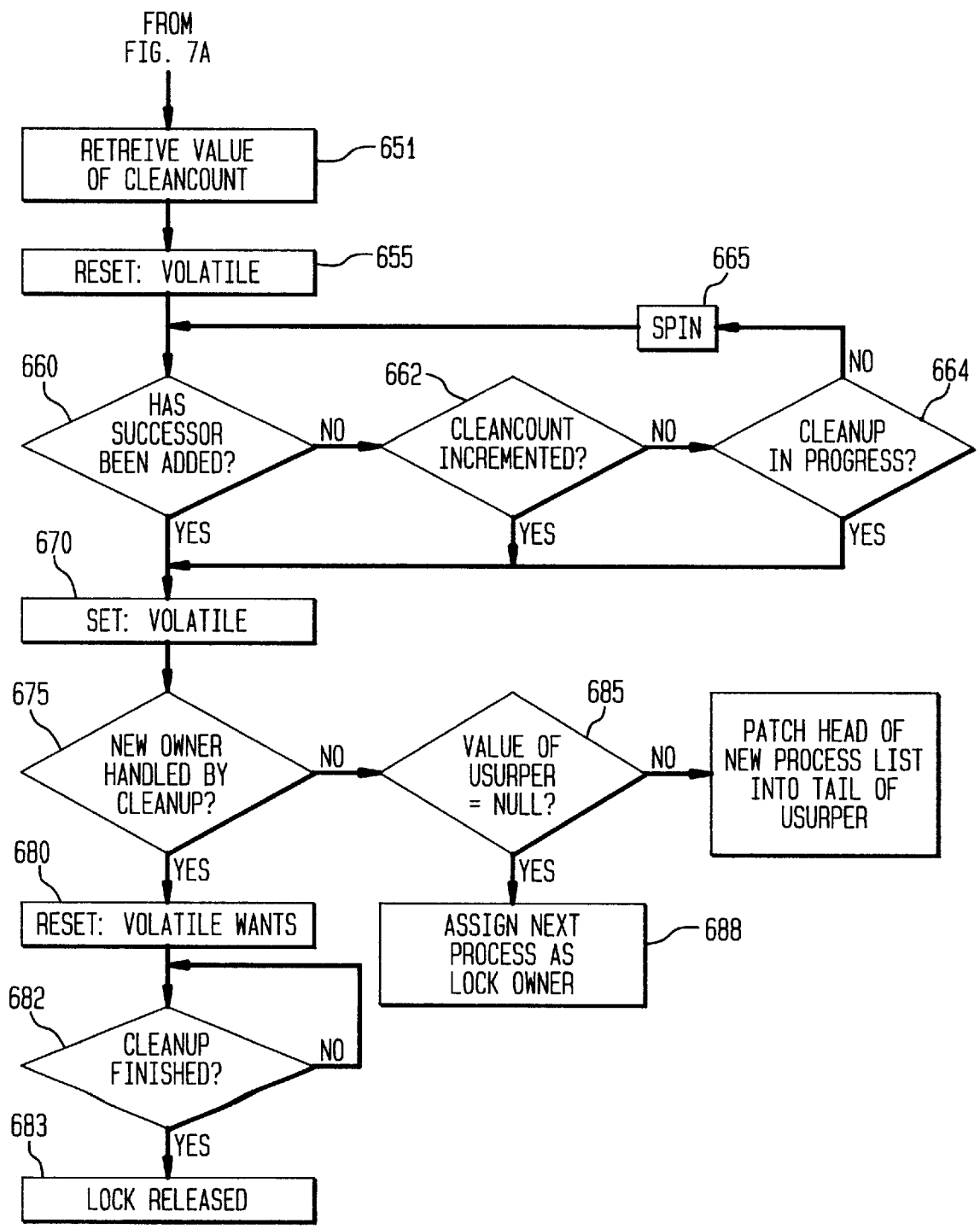

As shown in FIG. 7A, steps 600–637 are identical to steps 400–437 as described above. Thus, as shown in FIG. 7A, the first step 605 of the modified recoverable spin-lock release procedure 600 involves initializing the volatile flag 29 to true, to indicate the intention to modify the queue structure 130. Next, at steps 610–622 the routine 600 checks for cleanup-in-progress as did the recoverable lock acquisition routine at corresponding steps 310–322. Particularly, step 610 involves checking the status of the cleanup-in-progress flag 33. At step 612, if cleanup-in-progress is determined to be true, then at step 615, the volatile flag is reset to false, thus preventing the process from releasing the lock due to the cleanup mechanism. At steps 618 and 620, the process waits until the cleanup routine is finished before returning failure to the caller at step 622 and prompting the calling processor to try again.

If the cleanup-in-progress flag 33 was not set (i.e., false) at step 612, then at step 625, a determination is made as to whether the Qnode process releasing the lock has a successor in the queue, i.e., whether the releasing Qnode's next pointer is null or linked to the next successive Qnode on the queue. If the Qnode releasing the lock does have a successor (next pointer not null), then at step 630, the successor's locked flag is set to OWNED status, and the releasing Qnode is unlinked from the queue by setting its next pointer to null. Then, at step 635, the wants flag 27 is set back to NULL and the volatile flag back to false and the lock release is successful as indicated at step 637. If at step 625, it was determined that the Qnode's next pointer was null, there is still the possibility that other processes may have linked themselves into the queue during the time between the check of the next pointer and the update of lock→tail. Thus, without the benefit of atomically updating the lock→tail pointer by invoking the compare-and-swap instruction, a determination is made at step 640 as to the content of lock→tail by performing a first swap atomically to put NULL into the lock and to determine which Qnode the lock→tail pointer 25 is pointing. The returned value is placed in a variable old-tail and at step 645, a determination is made as to whether old-tail points to the releasing process's node. If old-tail (i.e., content of lock→tail) does point to the releasing process's node, then the releasing process was the only process in the queue, then at step 647, the wants flag 27 is set back to NULL and the volatile flag 39 back to false and an indication that the lock release is successful is made at step 649.

If old-tail (i.e., content of lock→tail) does not point to the releasing process's node, then one or more additional new processes $P_{add}$ might have added themselves to the queue in the timing window between the test that indicated the releasing process node was alone in the list (at step 625) and the swap at step 640. This addition of unpatched Qnode entries is shown in FIG. 7A as the arrow $P_{add}$. Consequently, old-tail points to the last of these unpatched processes.

To patch these newly added process nodes correctly on the queue, it is necessary to fill the releasing process' next pointer. However, to account for the possibility that additional "usurping" process that may have added itself to the queue, a second swap is performed at step 650 to again check the contents of lock→tail since the contents of the lock may have changed by a usurping process since the time of the first swap as indicated by the arrow $P_{usurp}$ in FIG. 7A. The value in lock→tail representing the last usurping process as a result of the second swap is placed into to a variable called usurper. Then, as shown at steps 651 in FIG. 7B, the present value of cleancount variable is retrieved and at step 655, the volatile flag is unset (false) to ensure the key property that processes make progress while their volatile flag is set to true.

At steps 660 and 665, the process releasing the lock waits for the head of the list of unpatched processes to set the releasing process's next field 23 to indicate that a successor has been added and could properly pass lock ownership. However, to recover the lock in the case that the process terminates before passing ownership, which would in effect cause an infinite loop as the releasing process spins, a check is provided at steps 662 and 664, respectively, to determine whether the value of cleancount which had been previously retrieved at step 651 has been incremented and whether the cleanup routine has been invoked. As mentioned above, the cleancount variable is a flag that is set by the cleanup routine and is incremented when the cleanup routine has assigned a new lock owner and ensures that the releasing process does not also attempt to pass on ownership, which would corrupt the locking mechanism. Thus, if the determination at steps 662 and 664 indicates that the cleancount flag has been incremented, then that process has terminated and the cleanup routine 500 will be responsible for freeing the lock from the releasing process, e.g., while the process is spinning at step 675. If the condition that the lock ownership has passed (i.e., releasing process's next pointer is not NULL) or the cleanup routine is invoked or cleancount flag has already been updated, then at step 670, the volatile flag is set back to true.

At step 675, a determination is made as to whether new owner has been assigned or is about to be assigned by the cleanup routine. If an owner has or is to be assigned by the cleanup routine, then at step 680, the wants flag 27 is set back to NULL and the volatile flag 29 back to false. At step 682, the process waits until the cleanup routine is finished before returning an indication that the lock release is successful as indicated at step 683.

If it is determined at step 675 that the assignment has not been made by a process, it is now necessary to check whether any usurping process now owns the lock. Therefore, at step 685, a check is made to determine if usurper equals null which would indicate that the lock has not changed, i.e., there were no usurping processes added to queue. If the value of usurper is NULL, then no one else attempted to add themselves to the list, and the unpatched list of entries ending in old-tail are the only nodes that are to be patched into the queue. In this case, as indicated at step 688, the locked flag 25 for the beginning of that unpatched list of nodes is set to OWNED.

If it was determined at step 685 that usurper is not NULL, then other nodes (usurpers) were added to the list. Since the first node that had been added saw a NULL lock pointer, it immediately assumed that it had the lock and the usurper pointer, as a result of the second swap (at step 650) represents the end of this list. Therefore, to maintain continuity of the list, the list of unpatched lost nodes should be patched into the list after usurper. Thus, at step 690, an assignment is made to effect the insertion of the unpatched list of nodes behind the tail of the usurper list by assigning the lead process's next pointer (i.e., the head of the unpatched list) into the next pointer of the tail of the usurper list to restore the structure of the queue.

Figure 8A:
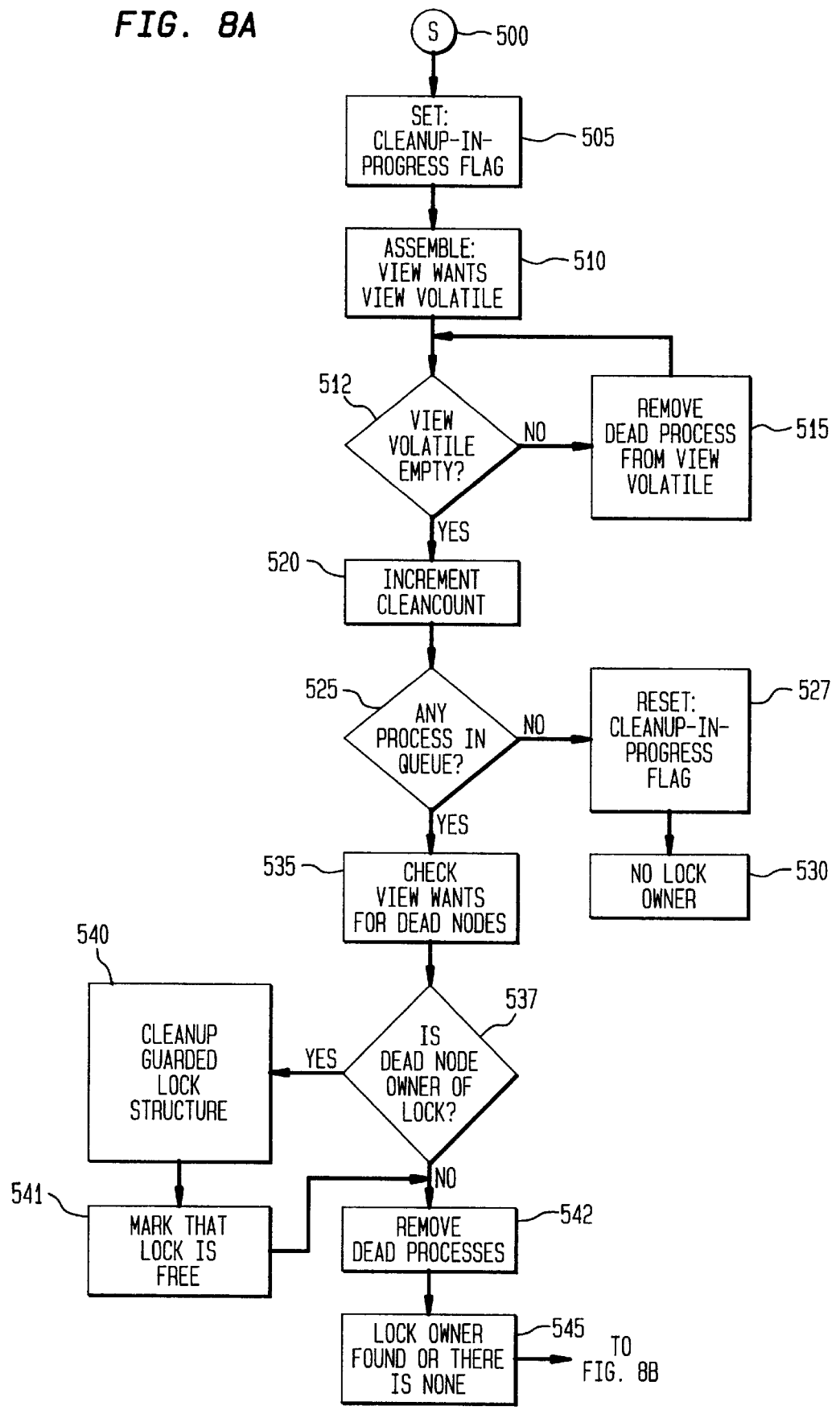
FIGS. 8A and 8B illustrate the clean-up routine implemented by the cleanup server of the invention to repair spin lock queue structure and recover the lock.

As mentioned above, the recoverable spin lock mechanism is provided with the cleanup server 150 that detects process failure, time-out or termination and implements a cleanup routine 500 upon such detection to cleanup the queue structure and coordinate allocation and de-allocation of Qnode structures to restore the Queue list to consistency. This cleanup routine 500 is now described with reference to FIGS. 8A and 8b. A C-language pseudo-code representation implemented by the cleanup-server is shown attached hereto in Appendix C.

The procedure cleanup routine 500 first proceeds at step 505 by setting the cleanup-in-progress flag 33 to true in the lock structure 240 (FIG. 4B). By doing this, processes which do not already have their volatile flag set are prevented from modifying the queue structure. At step 510, a list of all processes interested in the lock is assembled and the set ViewWants is generated by noting the set of processes with their wants pointer pointing to the lock. Additionally, the subset ViewVolatile containing a list of those processes that may be potentially modifying the queue structure is generated by noting the set of processes having their volatile flag set to true and wants points to lock. At step 515, a determination is made as to whether the ViewVolatile set has emptied out, indicating that no (live) processes can be modifying the queue. Specifically, at step 515 the cleanup process will remove any terminated process or any process that is no longer in a volatile state and will wait until the ViewVolatile subset has emptied out from the ViewWants set, ensuring queue stability. Once all processes interested in the lock are no longer volatile, the cleancount for the lock is incremented at step 520 to ensure that a process which was releasing the lock will not continue to release it after the cleanup routine has assigned a new owner. Next, at step 525, a simple check is made to determine if any processes are left in the queue, i.e., whether spinning or owning. This is done by checking the lock→tail pointer to see if it is null, i.e., not pointing to any Qnode. If it is null, then there are no more processes in the queue and the cleanup-in-progress 33 flag is reset (to false) at step 527. Of course, if there are no processes in the queue 130, no process can be owning the lock as indicated at step 530.

If there are processes in the queue, then a check is made to determine which node(s) owns the lock. To do this, the set ViewWants is first checked at step 535 to determine the dead or terminated nodes found by the clean-up server 50. At step 537, a determination is made as to whether any terminated node found happens to be the owner of the lock. If the terminated process (node) is the owner of the lock, then at step 540, then the structure guarded by the lock is suspect and is cleaned up by implementing a user-supplied routine. Such a user-supplied routine, for instance, is specific to the particular resource which is guarded by the lock and will be invoked to ensure that the resource is not in an incoherent or garbage state. An example would be a printer that is guarded by the lock and which might stop in the middle of printing due to a process dying. To cleanup the guarded lock structure, e.g., the printer, the user-supplied cleanup routine may execute a form feed or take other corrective action to recover the shared data. If the owner or any waiting process terminates immediately after being determined to be alive by this check, it will be caught by a subsequent run of the cleanup routine. After "cleaning-up" the lock guarded structure, the lock is now free as indicated at step 541 and the process returns to step 542 to remove terminated processes. Then, at step 545, there either exists a lock owner or there is none. Otherwise, at step 537, if none of the terminated processes found is the owner of the lock, then the terminated processes acted on by the cleanup routine 500 are removed from the ViewWants set at step 542. Any node in ViewWants that has not terminated and has its locked flag having the value of OWNER is the owner of the lock as indicated at step 545.

Figure 8B:
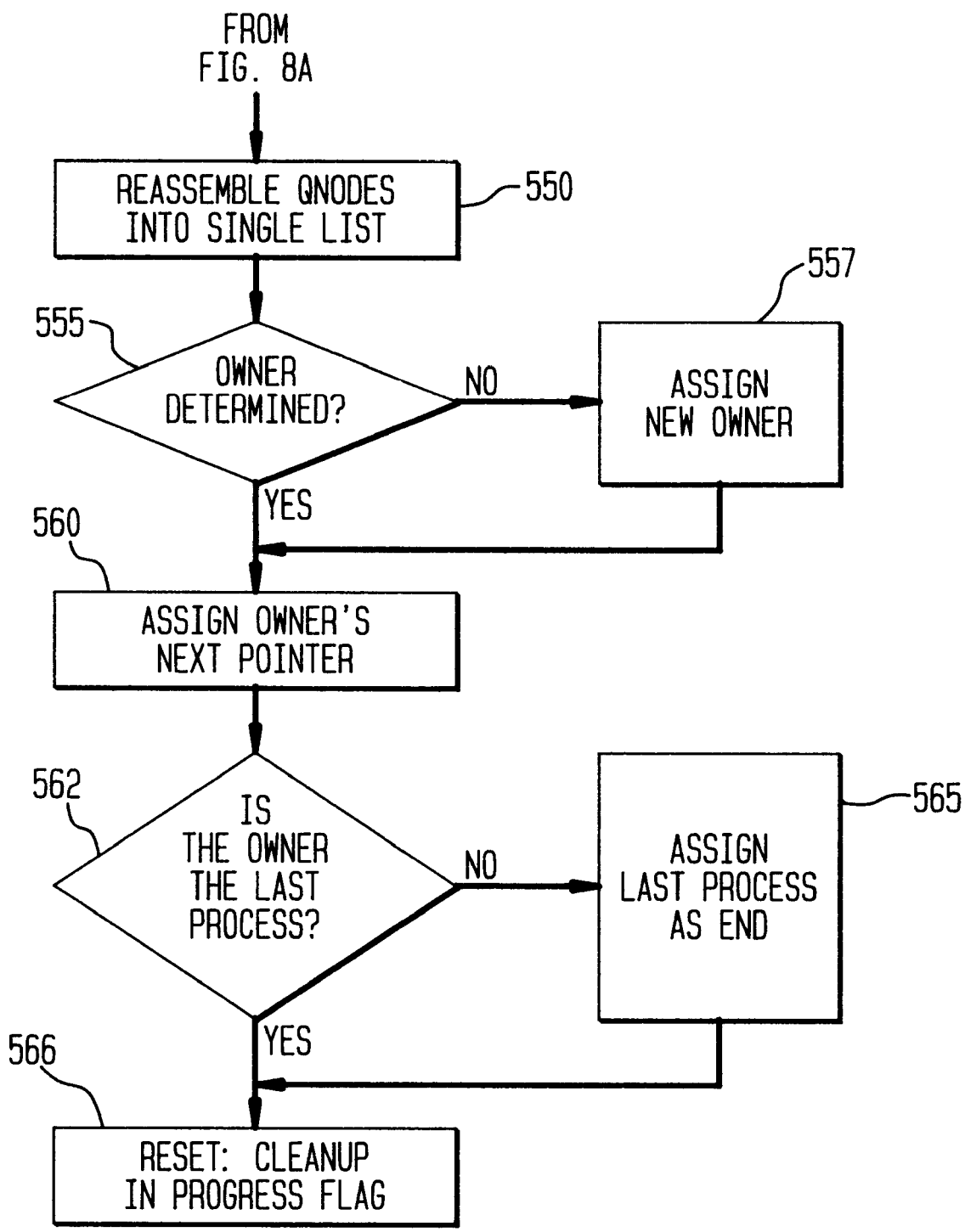

As shown at step 550 in FIG. 8b, the Qnodes for all live processes who are waiting on the lock, other than the one pointed to by the lock itself, are reassembled into a single list. Thus, all Qnodes in ViewWants that are waiting on the list are re-attached and any breaks in the queue caused by terminated processes are connected. If it is determined that lock→tail is not null and points to a waiting Qnode (alive), then that Qnode is determined to be the last Qnode of the reassembled queue. Otherwise, any breaks in the list caused by terminated processes are re-attached in an arbitrary manner, thus failing to preserve the original FIFO lock transfer order of the queue in the case of process terminations at inopportune times.

More specifically, at step 555, a determination is made whether the process owning the lock was determined. If the owner of the lock was not determined, then the routine will assign the owner to the process at the head of the queue by filling that process's Qnode locked flag to OWNED at step 557. If the lock owner had been determined, then at step 560 the routine assigns its next pointer to the next process in the newly connected queue list. Next, at step 562, a determination is made as to whether the last process of the newly connected queue list is the owner, i.e., there is only a single process in the queue. If the last process is not the owner, then at step 565 the last process of the queue is assigned the end. Otherwise, at step 567, and lock→Tail is assigned to point to the last (and only) process in the newly constructed queue. Finally, at step 566, the lock is returned to active use by resetting the cleanup-in-progress back to false.

It is understood that if a process terminates immediately after it has been included in the queue by the cleanup routine, but before the routine returns to the user, then the terminated process is caught by a subsequent run of the cleanup routine. Furthermore, if the deallocation and subsequent reallocation of the Qnode structures occur during cleanup, then the cleanup routine is in charge of deallocating Qnode structures. It follows that a process has been "seen to be dead" by the cleanup routine if an operating system call, (e.g., the call IS_DEAD) was made on that process at step 535 and returned true. Any time the cleanup mechanism notices that a process has terminated, it calls the cleanup routine, unless that process's wants pointer is null, or that process was seen to be dead by a previous run of the cleanup routine.

Figure 1:
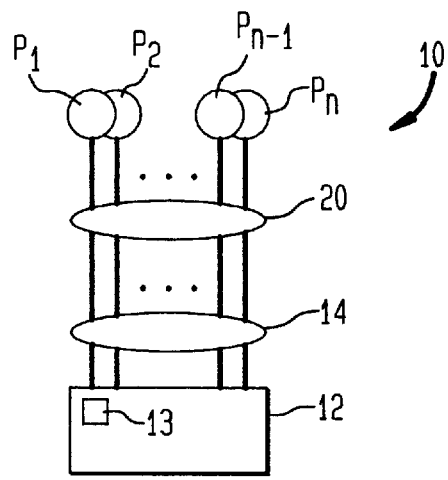
FIG. 1 is a diagram showing a multiprocessing system containing multiple processors that share a common memory location.

As described herein, the hardware models shown in the FIGS. 1 and 3 illustrate multiple processors sharing a common memory. The methodology described herein takes into account the difficulties faced in implementing synchronization algorithms on modem processors, by assuming a weak memory model in which writes issued by one processor can be seen in a different order by another processor, unless certain synchronization instructions are used. In particular, the Partial Store Ordering (PSO) model is implemented. The particular formalism was intended to model the SPARC architecture (Sun Microsystems Inc.), however, the recovering scalable spin lock may be transported into other systems having processors that implement similar consistency models. Moreover, the recovering scalable spin lock may be readily transported into multi-processing systems employing atomically implemented hardware instructions (e.g., swap), without the need for additional hardware.

It should be understood that the preferred embodiments and examples described are for illustrative purposes only and are not to be construed as limiting the scope of the present invention which is properly delineated only in the appended claims.

Appendix A

```
acquire-lock(Lock *lock, register Qnode *mynode)
{
        mynode→next = NULL;
        Qnode *predecessor;
A1:     mynode→volatile = true;
A2:     mynode→wants = lock;
        (fence)
A3:     if (lock→cleanup-in-progress) {
A4:             mynode→wants = NULL;
A5:             mynode→volatile = false;
A6:             while(lock,cleanup-in-progress) sleep(a little while);
A7:             return FAILED-TO-ACQUIRE LOCK-TRY-AGAIN;
        }
A8:     mynode→locked = WAITING;
A9:     predecessor = swap(lock→tail,mynode);
A10:    if(predecessor != NULL){
A11:            predecessor→next = mynode;
                (fence)
A12:            mynode→volatile = false;
A13:            while(mynode→locked != OWNED);//spin
        }
        else {
A14:            mynode→locked = OWNED;
                (fence)
A15:            mynode→volatile = false;
        }
A16:    return LOCK-ACQUIRED;
}
```

Appendix B

```
release-lock(Lock *lock, Qnode *mynode)
{
R1:     mynode→volatile = true;
        (fence)
R2:     if(lock→cleanup-in-progress) {
R3:             mynode→volatile = false;
R4:             while(lock→cleanup-in-progress) sleep(a little while);
R5:             return LOCK-PARTIALLY-RELEASED-TRY-AGAIN;
        }
R6:     mynode→locked RELEASED;
R7:     if(mynode→next = NULL) {
R8:             if(compare-and-swap(lock→tail, mynode, NULL)) {
R9:                     mynode→volatile = false;
R10:                    mynode→wants = NULL;
R11:                    return LOCK-RELEASED;
                }
R12:            int cc = lock→clean-count;//Flag set by cleanup process
                (fence)
R13:            mynode→volatile = false;
R14:            while(mynode→next == NULL && cc = lock→clean-count
                        && lock→cleanup-in-progress == false); // spin
R15:            mynode→volatile = true;
                (fence)
R16:            if(lock→cleanup-in-progress || cc != lock→clean-count) {//Cleanup assigned new lock
                                                                            owner
R17:                    mynode→volatile = false;
                        mynode→wants = NULL;
R18:                    while(lock→cleanup-in-progress) sleep(a little while);
                        return LOCK-RELEASED;
                }
R19:    }
        (fence)
R20:    mynode→next→locked = OWNED;//Release lock to next process in queue
R21:    (fence)
R22:    mynode→volatile = false;
R23:    mynode→wants = NULL;
R24:    return LOCK-RELEASED;
}
```

Appendix C

```
cleanupMCSLock(Lock *lock)
{
C1:     lock→cleanup-in-progress = true;//t-start;
        (fence)
C2:     ViewWants = set of processes who want lock;
C3:     ViewVolatile = set of processes in ViewWants whose volatile field is true;
        //t-view
C4:     while (ViewVolatile != φ) {
C5:         for each process P in ViewVolatile
                if (!P→volatile || IS-DEAD(P))
C6:                 remove P from ViewVolatile;
        }
C7:     //t-stable
C8:     lock→clean-count++;
C9:     if(lock-tail == NULL) {
            lock→cleanup-in-progress = false;
            (fence)
C10:        return;
        }
C11:    owner = NO-PROCESS;
C12:    foreach node Q in ViewWants {//Find owner; remove dead processes from ViewWants
C13:        if(IS-DEAD(Q→pid)) {
                if(Q→locked == OWNED) {
C14:                lock→cleanup-guarded-structures( );
                    Q→locked = RELEASED;
                }
C15:            remove Q from ViewWants;
            }
            else if(Q→locked == OWNED)
C16:            owner = Q;
        }
        end = NO-PROCESS;
        if(!IS-DEAD(lock→tail))//lock→tail is not NULL by previous check
C17:        end = lock→tail;
C18:    (newHead,newTail) = reattach all Qnodes in ViewWants with (Q→locked =
            WAITING),
                            except for "end", in arbitrary order
        //"end" may be detached from rest of semaphore wait list at this point, but every other
        //waiting process is in list
        if(owner != NO-PROCESS)
C19:        owner→next = newHead;
        else {
C20:        owner = newHead;
C21:        if (owner != NO-PROCESS) owner→locked = OWNED;
        }
        if (end != NO-PROCESS && end != owner)
C22:        newTail→next = end;
        else
C23:        lock→tail = newTail;
        (fence)
C24:    lock-cleanup-in-progress = false;//t-finish
}
```

Appendix D

```
release-lock(Lock *lock, Qnode *mynode)
{
        Qnode *old-tail, *usurper;
        mynode→volatile = true;
        (fence)
        if(lock→cleanup-in-progress) {
            mynode→volatile = false;
            while (lock→cleanup-in-progress) sleep(a little while);
            return LOCK-PARTIALLY-RELEASED-TRY-AGAIN;
        }
        mynode→locked = RELEASED;
        (fence)
        if(mynode→next == NULL) {
S1:         old-tail = swap(lock-tail, NULL);
            if (old-tail == mynode) {
                mynode→volatile = false; mynode→wants = NULL;
                return LOCK-RELEASED;
            }
        }
        usurper = swap(lock→tail, old-tail);
        int cc = lock→clean-count;
        (fence)
        mynode→volatile = false;
```

```
S2:             while(mynode→next == NULL && !cleanup-in-progress
                        && cc == lock→clean→count);//spin
        (fence)
        mynode→volatile = true;
S3:             if(lock→cleanup-in-progress or cc != lock→clean-count){
                        mynode→volatile = false;
                        mynode→wants = NULL;
                        while (lock→cleanup-in-progress) sleep(a little while);
                        return LOCK-RELEASED;
                }
                if (usurper = NULL) mynode→next→locked = OWNED;
                else usurper→next = mynode→next;
        }
        else
                mynode→next→locked = OWNED;
        mynode→next = NULL;
        (fence)
        mynode→volatile = false;
        mynode→wants = NULL;
        return LOCK-RELEASED;
}
```

We claim:

1. A method for recovering spin locks in a system having one or more processes capable of accessing a shared resource, the system providing a lock indicating exclusive access of the shared resource by a single process and enabling one or more processes to repeatedly attempt to gain ownership of the lock when exclusive access to the shared resource is desired, said method for recovering spin locks comprising the steps of:

generating a queue structure including a process currently having exclusive access to the lock and adding processes that desire ownership of the lock to said queue structure;

setting a first status flag indicating a desire of one of said processes to be added to said queue structure;

setting a second status flag indicating that said one process is currently modifying the queue structure;

monitoring a third status flag indicating whether said queue structure is being restored and not attempting to modify said queue structure if said queue structure is being restored;

conducting a cleanup process if one or more of said processes indicated by said first status flag set have terminated, said cleanup process removing said one or more of said terminated processes from said queue structure, setting said third status flag to indicate that recovery of said queue structure is in process, and recovering said queue structure after all modification activity on said queue structure has finished; and resetting said third status flag after completion of said cleanup process to indicate that said recovery process has completed.

2. The method for recovering spin locks as claimed in claim 1, further including the step of determining whether one or more of said terminated processes has exclusive access to said lock and assigning to a new process exclusive access to said lock for said queue structure after restoring consistency to said queue structure.

3. The method for recovering spin locks as claimed in claim 1, wherein for each new process desiring to have exclusive access to the lock, the step of checking if said third status flag has been set before attempting to be added to said queue structure and resetting that process's associated first and second status flags if said third status flag has been set.

4. The method for recovering spin locks as claimed in claim 1, wherein the modifying step further includes the step of waiting for said queue structure to stabilize by allowing processes currently modifying the queue structure to complete their respective modifications, and resetting their respective second status flags after the queue structure has been modified.

5. The method for recovering spin locks as claimed in claim 1, wherein each said data structure associated with each process of said queue structure further includes a pointing mechanism for pointing to a next process in said queue structure that may obtain exclusive access to said lock, and a fourth status flag indicating whether the process has exclusive access of or waiting to have exclusive access to said lock.

6. The method for recovering spin locks as claimed in claim 1, wherein the conducting step further includes the step of determining the status of all said processes waiting to own the lock by assembling a set of processes having their respective first status flags set and determining the status of all said processes that are currently modifying the queue structure by assembling a subset of the processes having their respective second status flags set.

7. The method for recovering spin locks as claimed in claim 1, wherein the step of recovering said queue structure includes repairing any break in said queue structure caused by removing said one or more terminated processes from said queue structure.

8. The method for recovering spin locks as claimed in claim 1, wherein said observing with a cleanup process step further includes the steps of polling said processes of said processing system to determine if one or more said processes has terminated.

9. The method for recovering spin locks as claimed in claim 1, wherein for each said one or more processes, generating a signal to indicate when that process has terminated.

10. The method for recovering spin locks as claimed in claim 1, wherein the system employs atomically implemented hardware instructions, said method including implementing a swap hardware instruction.

11. The method for recovering spin locks as claimed in claim 7, wherein said step of repairing any break in the queue structure includes deallocating the data structures of the respective terminated one or more processes.

12. The method for recovering spin locks as claimed in claim 10, further including implementing a compare-and-swap hardware instruction.

13. A method for providing multiple processes with mutually exclusive access to a shared resource in a system having a lock associated with the shared resource, possession of the lock signifying exclusive access to the shared resource, wherein processes desiring access to the shared resource spin on the lock until the lock is acquired, the method comprising the steps of:

maintaining a linked queue structure of data records corresponding to a queue of processes including processes spinning on the lock and a process possessing the lock, one data record per process;

transferring the lock from the process possessing the lock to a process next in the queue;

conducting a cleanup process if one or more processes in the queue have terminated, said cleanup process removing said one or more terminated processes from the queue and reassembling the linked queue structure.

14. The method for providing multiple processes with mutually exclusive access to a shared resource according to claim 13, wherein each of said data records comprises:

a locked flag representing status of the lock for a process corresponding to the data record;

a next pointer pointing to a data record immediately next in the queue;

a wants pointer indicating whether a process corresponding to the data record is in the queue or requests to be added to the queue, all wants pointers of the data records providing an over-estimation of ownership of the lock; and a volatile flag indicating that the process corresponding to the data record intends to modify the linked queue structure.

15. The method for providing multiple processes with mutually exclusive access to a shared resource according to claim 14, wherein said step of maintaining a linked queue structure of data records further includes the steps of:

maintaining a tail pointer pointing to last data record in the linked queue structure;

maintaining a cleanup-in-progress flag indicating whether the cleanup process is being conducted.

16. The method for providing multiple processes with mutually exclusive access to a shared resource according to claim 15, wherein said step of maintaining a linked queue structure of data records further includes the step of preventing initiation of the cleanup process while the linked queue structure is being modified by one or more of the multiple processes; and said step of conducting the cleanup process further comprises the steps of:

preventing the multiple processes from modifying the linked queue structure during the cleanup process;

releasing the lock from the process possessing the lock;

providing an indication that the lock has been released, so that the process possessing the lock does not transfer the lock;

transferring the lock to a new owner process, the new owner process being one of the processes spinning on the lock.

17. A method for providing multiple processes with mutually exclusive access to a shared resource in a system having a lock associated with the shared resource, possession of the lock signifying exclusive access to the shared resource, wherein processes desiring access to the shared resource spin on the lock until the lock is acquired, the method comprising the steps of:

step for maintaining a linked queue structure of data records corresponding to a queue of processes including processes spinning on the lock and a process possessing the lock, one data record per process spinning on the lock or possessing the lock;

step for acquiring the lock by a first of said multiple processes;

step for releasing the lock by the first of said multiple processes;

step for preventing the multiple processes from modifying the linked queue structure during the cleanup process;

step for conducting a cleanup process if one or more processes in the queue have terminated, the cleanup process including removing said one or more terminated processes from the queue and reassembling the linked queue structure;

step for preventing the multiple processes from modifying the linked queue structure during the cleanup process; and step for preventing initiation of the cleanup process while the linked queue structure is being modified.

\* \* \* \* \*